(12) United States Patent
Astarabadi

(10) Patent No.: US 6,466,836 B1
(45) Date of Patent: Oct. 15, 2002

(54) METHOD AND APPARATUS FOR ENCODING OR DECODING A HUMAN READABLE REPRESENTATION OF OPTIONS DIFFERENTIATING PRODUCTS OR SERVICES

(75) Inventor: Shaun Astarabadi, Laguna Niguel, CA (US)

(73) Assignee: Toshiba America Information Systems, Inc., Irvine, CA (US)

( * ) Notice: Subject to any disclaimer, the term of this patent is extended or adjusted under 35 U.S.C. 154(b) by 0 days.

(21) Appl. No.: 09/301,046

(22) Filed: Apr. 28, 1999

(51) Int. Cl.$^7$ ................................................ G06F 19/00
(52) U.S. Cl. ........................ 700/115; 700/215; 700/216
(58) Field of Search ..................... 235/385; 700/115, 700/116, 215, 216; 707/100, 101, 102, 104; 705/26, 23

(56) References Cited

U.S. PATENT DOCUMENTS

| | | |
|---|---|---|
| 5,260,866 A | 11/1993 | Lisinski et al. |
| 5,307,261 A | 4/1994 | Maki et al. |
| 5,311,424 A | 5/1994 | Mukherjee et al. |
| 5,412,576 A | 5/1995 | Hansen |
| 5,440,479 A | 8/1995 | Hutton |
| 5,515,269 A | 5/1996 | Willis et al. |
| 5,625,776 A | 4/1997 | Johnson |
| 5,745,681 A | 4/1998 | Levine et al. |
| 5,754,850 A | 5/1998 | Janssen |
| 5,959,275 A * | 9/1999 | Hughes et al. ............... 235/375 |
| 6,182,275 B1 * | 1/2001 | Beelitz et al. ................. 717/1 |
| 6,185,471 B1 * | 2/2001 | Sturdivant .................. 700/115 |
| 6,202,070 B1 * | 3/2001 | Nguyen et al. ............. 707/104 |

OTHER PUBLICATIONS

Vehicle Identification Numbers, (Author Unknown), http://www.angelfire.com/ca/TORONTO/VINcode.html, 1980.*
B–2 Vehicle Identification Number Bar Code Label Standard, (Author Unknown), http://www.aiag.org/publications/b2.html, 1988.*
Motor Vehicle Safety Act, Motor Vehicle Safety Regulations, Standard 115, (Author Unknown), http://www.tc.gc.ca/actsregs/mvsa/jan98/english/mvsr115.html, 1998.*
Saturn Interactive Pricing Center web page, Date Unknown.

* cited by examiner

Primary Examiner—Richard L. Ellis
(74) Attorney, Agent, or Firm—Pillsbury Winthrop LLP

(57) ABSTRACT

A method and apparatus for generating a unique and reversible human readable number is disclosed. The human readable number is comprised of human readable symbols for representing a specific combination of selected options in differentiated products in built-to-order systems or differentiated services in an overall customized service package. The human readable number preferably represents many possible permutations of available options, which are selectable by a customer. The human readable number maintains its uniqueness and reversibility when the number of options are increased, or when new differentiated products or services are added.

38 Claims, 5 Drawing Sheets

FLOW CHART OF ENCODING TO FORM PART NUMBER

FLOW CHART OF ENCODING TO FORM PART NUMBER

FLOW CHART OF DECODING FROM PART NUMBER

Part Number Format

| Component Format (version 0) | | | | |
|---|---|---|---|---|
| CPU field | HDD field | RAM field | Reserved | V # |

FIGURE 7

METHOD AND APPARATUS FOR ENCODING OR DECODING A HUMAN READABLE REPRESENTATION OF OPTIONS DIFFERENTIATING PRODUCTS OR SERVICES

BACKGROUND

1. Field of the Invention

The present invention relates, in general, to systems for representing differentiated products or services in a built-to-order system or an overall customized service package, respectively, by human readable numbers comprised of human readable symbols.

2. Related Art

A customized built-to-order system or an overall customized service package may allow a customer to select from a large number of possible permutations of options of differentiated products or services. It is difficult to represent the specific combination of selected options in a manageable format other than providing all of the selected options in a list. Due to the number of differentiated products or services and the number options available for each product or service, the list of all the selected options may be very long.

In the alternative, a "serial number" may be assigned to each possible permutation of the selected options in the built-to-order system or the customized service package. Generally, there is no correlation between the serial number and the specific combination of the selected differentiated products or services, other than their assignment to each other on a look-up table. When new products or services or new options become available, new serial numbers for all the new possible permutations of the built-to-order system or the customized service package must be generated again.

Furthermore, these serial numbers themselves may be quite long, often times lengthy and confusing. These serial numbers typically are comprised of a series of numbers and letters having no relation to each other. Confusing serial numbers may lead to an incorrect assembly of the selected options of the built-to-order system or having the wrong services performed for the customized service package.

Consequently, this leads to the storage and maintenance of large quantities of data over time. On the other hand, to look up the part number for a given combination of options could require a lengthy search of all the records for a given model. The turnaround time for returning results for lengthy searches may become unacceptable, especially when multiple users utilize the system concurrently, as is typically the case when using the Internet.

SUMMARY

An object of an embodiment of the present invention is to improve the efficiency in the ordering, manufacturing, and tracking of built-to-order systems.

Another object of an embodiment of the present invention is to provide improved service in a customized service system offering a variety of choices of services as part of an overall customized service package.

Another object of an embodiment of the present invention is to provide a unique and reversible human readable part number representing a specific combination of selected options in differentiated products in built-to-order systems.

Another object of an embodiment of the present invention is to provide a human readable part number that is preferably manageable in the representation of all the possible permutations of the options available in the built-to-order system.

Still another object of an embodiment of the present invention is to provide a human readable part number that is preferably readily identifiable with selected options of differentiated components for a product that is offered by the built-to-order system.

Furthermore, an object of an embodiment of the present invention is to provide a human readable part number that preferably maintains its uniqueness and reversibility when the number of options are increased, or when new differentiated products are added.

Briefly, an embodiment of the present invention is directed to a method for generating human readable symbols representative of a customer order, including first representing an option selected from at least one option associated with differentiated products or services with a binary bit field value. The selected groups of the binary bit field values are combined into a string of bits in an ordered sequence. The string of bits are then partitioned into fixed length partitions. Finally, each of the fixed length partitions are represented by a human readable symbol.

All of the human readable symbols may be read together in sequence to produce the human readable number. The human readable number includes all of the information required to express all of the selected options of differentiated products in the built-to-order system or differentiated services in an overall customized service package. Therefore, with knowledge of the options and format of the human readable numbers, one can uniquely determine the selected options.

Embodiments of the present invention produce a unique and reversible human readable number that represents the selected options in differentiated products in built-to-order systems or differentiated services in an overall customized service package. The format of the human readable number and the known available options determine all of the selected options in differentiated products or services.

Improved efficiency in the ordering, manufacturing, and tracking of built-to-order systems is achieved because the human readable part number is unique to each permutation of the options of the built-to-order system. Once all of the options are selected, the customer may receive a human readable part number that is unique to the selections made. The human readable part number can then be used to confirm the proper assembly of all the options selected for the built-to-order system, as well as track the built-to-order system along its assembly and shipment.

Embodiments of the present invention may also be applied to improve overall service of a service system providing a variety of choices that may be performed. In an overall customized service package, such as a car wash, the customer may be presented with a variety of different services, each with several options. Similar to the built-to-order system, the customer can choose the desired options of the different services offered, and a human readable number may be given to the customer. The human readable number is also obtained by the service providers to help ensure that the correct service options are performed.

Similar to that of the built-to-order computer system, the human readable number alone may be used to determine all the selected options in the differentiated services in the overall customized service package.

BRIEF DESCRIPTION OF THE DRAWINGS

FIG. 3 illustrates a part number format for storing a string of bits composed of one or more binary bit field values in accordance with an embodiment of the present invention.

FIG. 4 illustrates a part number format for storing a string of bits composed of one or more binary bit field values that are selected in accordance with an embodiment of the present invention.

FIG. 5 illustrates a part number format for storing a string of bits composed of one or more binary bit field values with reserved bit field values in accordance with an embodiment of the present invention.

FIG. 6 illustrates a part number format for storing a string of bits composed of one or more binary bit field values in accordance with an embodiment of the present invention representing a version number of the part number.

FIG. 7 illustrates a part number format for representing a string of bits partitioned into fixed length partitions with base-32 human readable symbols in accordance with an embodiment of the present invention.

DETAILED DESCRIPTION

An embodiment of the present invention is directed to a method of producing a unique and reversible human readable symbol representing a specific combination of selected options in differentiated products or services. Particularly, the human readable symbol is easy to read and capable of representing multiple combinations of selected options in differentiated products or services. The human readable number, when decoded, is all that is required to determine all the selected options in differentiated products or services. The human readable number is also unique to a particular combination of selected options in differentiated products or services.

Figure 8:
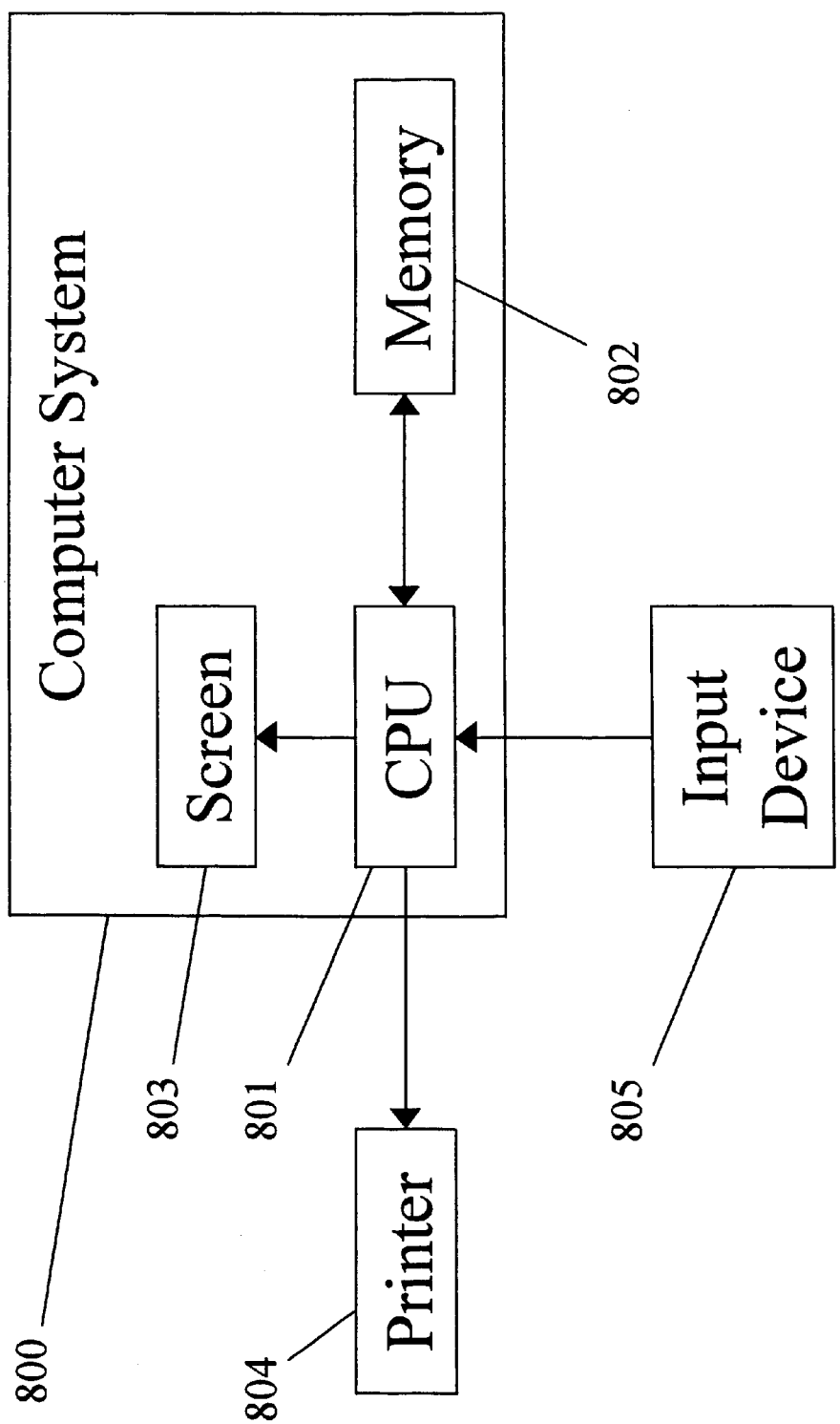

As shown in FIG. 8, an embodiment of the present invention is preferably implemented using a software program executing on a computer system 800 with one or more CPU's 801, a computer memory 802, such as a RAM, hard disk, floppy disk, etc., and a system for representing the human readable symbol in a human readable medium, such as a computer screen 803 or a computer printer 804 for producing printed media. The software program is preferably stored on a digital storage medium, such as a hard disk drive or CD-ROM. The software program includes instructions for encoding and decoding of the human readable number according to a preferred embodiment of the present invention. The software program also maintains reference tables, such as Tables 1 and 2 described below, that the software program uses after calling instructions to the processors. The processors execute the commands of the software program, perform the encoding and decoding processes, and refer back to the data of the reference tables of the software program stored in the computer memory to perform the encoding or decoding of the human readable number.

Once the human readable number is encoded by the steps performed by the processors to determine the selected options of differentiated products or services, the results are displayed in a human readable medium, preferably on a computer screen or a printout from a computer printer. After the decoding process, the selected options of differentiated products or services also may be displayed on a computer screen and printed out.

Figure 1:
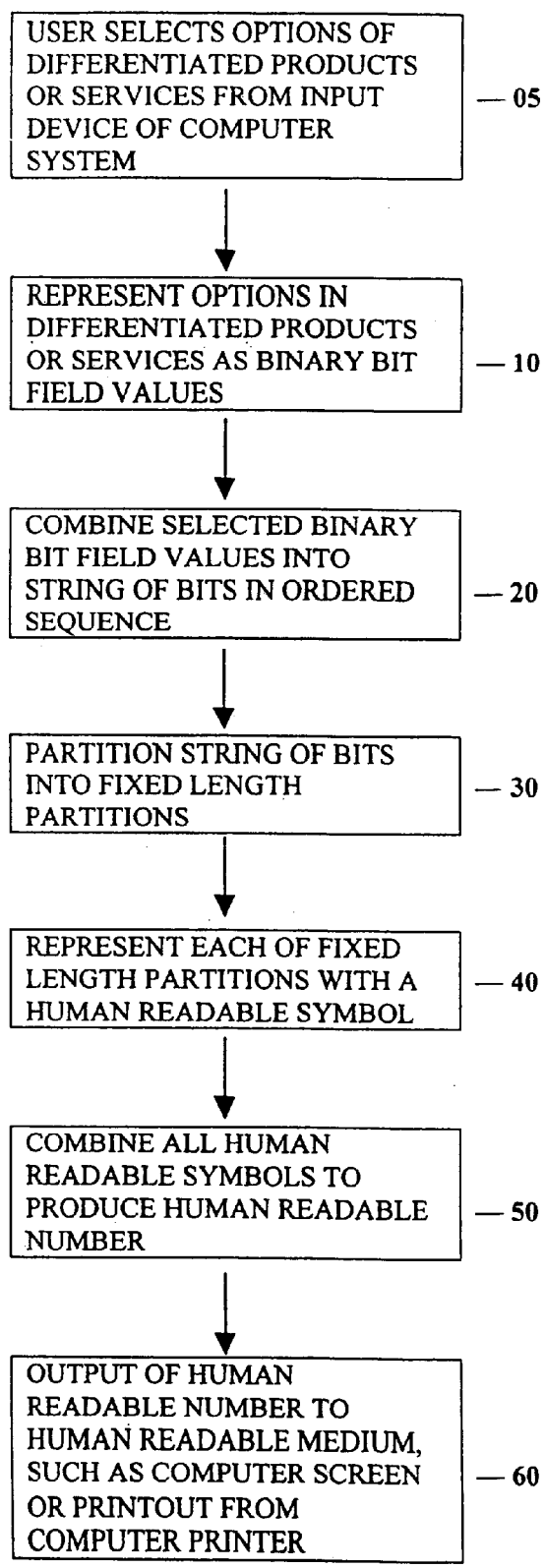
FIG. 1 is a flow chart diagram illustrating an encoding process to form a human readable number in accordance with an embodiment of the present invention.

FIG. 1 is a flow chart diagram illustrating an encoding process to form a part number in accordance with an embodiment of the present invention. The software program preferably performs steps 10 through 50. In step 05, a user seeking to obtain a built-to-order system or an overall customized service package makes selections from an input device of a computer system (such as a graphical user interface of a desktop computer or kiosk). The software program executes on the computer system and outputs onto a computer screen the options of differentiated products or services the user may select. After the user has selected all the desired options at step 05, step 10 represents the selected options as binary bit field values. These binary bit field values are stored in a computer readable medium, such as the computer memory RAM.

In the example in Table 1 below, a customer may select from three categories of options in a built-to-order system for a computer: (1) a CPU; (2) a hard disk drive (HDD); and (3) a RAM.

TABLE 1

Component Look-Up Table with Differentiated Products/Options/Field Values

| CPU | | HDD | | RAM | |
| --- | --- | --- | --- | --- | --- |
| Field Value | Option | Field Value | Option | Field Value | Option |
| 000 | 133 PII | 000 | 2 GB | 00 | 16 MB |
| 001 | 166 PII | 001 | 3 GB | 01 | 32 MB |
| 010 | 200 PII | 010 | 4 GB | 10 | 64 MB |
| 011 | 233 PII | 011 | 6 GB | 11 | 128 MB |
| 100 | 266 PII | 100 | 8 GB | — | — |

There are five options available for the CPU, five options for the hard disk drive, and four options for the RAM, each option represented in binary form as binary bit field values. The software program preferably maintains data structures associating each available option with its corresponding binary bit field value in a computer readable medium, preferably either in the computer memory (RAM) or on the hard disk drive. This allows the processors to access this data during the representation of options in step 10.

Each option within a category also has an associated component format version field (not shown). Initially, all the component format version fields are assigned zeros. However, once new options become available, the component format version field for that new option is assigned a new version number.

FIG. 3 illustrates a part number format for storing a string of bits composed of one or more binary bit field values in accordance with an embodiment of the present invention. A customer may select one option for each category of options in Table 1 for a built-to-order product. Step 20 combines the selected binary bit field values, currently stored in the computer memory, into a string of bits in an ordered sequence.

Figures 4, 5, 6, 7:
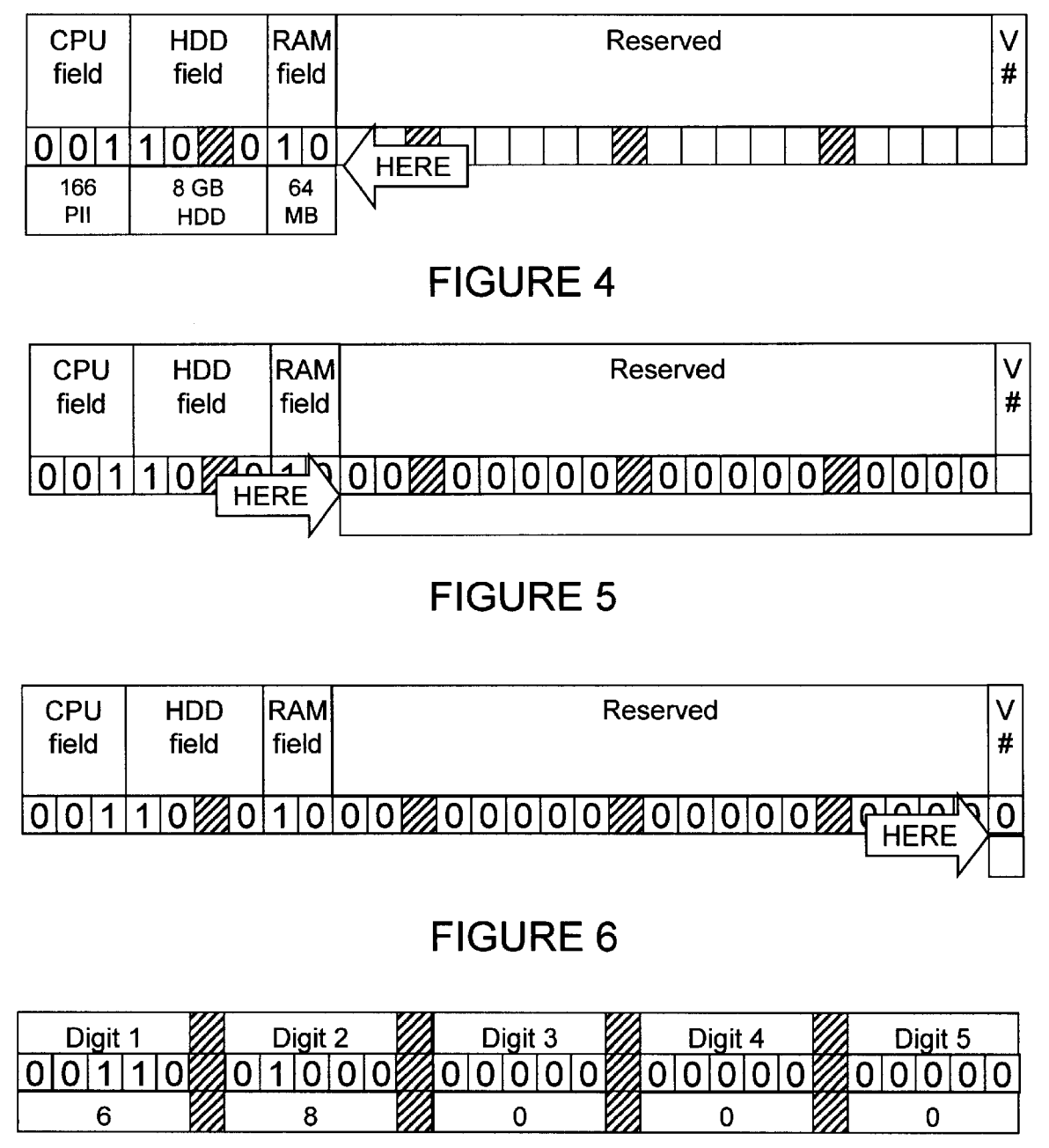

FIG. 4 illustrates the result of step 20 following a customer's selection of options for the CPU, HDD, and RAM. Step 20 stores a part number format consisting of the string of bits in a computer readable medium, preferably the computer memory (RAM). In the example in FIG. 4, the customer selected a 166 PII CPU (represented by the binary bit field value of "001"), an eight gigabyte hard disk drive (represented by the binary bit field value of "100"), and 64 megabytes of RAM (represented by the binary bit field value of "10").

FIG. 5 illustrates that additional bit fields of the part number format may be "reserved" so that additional features (i.e., additional categories of options) may be added. Alternatively, these reserved bit fields may enable additional options of the existing categories of options for the differentiated products requiring increases in length of the binary bit fields corresponding to the expanded categories of options. The additional "reserved" spaces are preferably assigned a "0" value when not in use.

FIG. 6 illustrates a part number format having a version number as one of the binary bit field values. In the example in FIG. 6, the version number of this part number format is "0". In the preferred embodiment, the version number binary bit field value plays an important role in interpreting the part number when new options are added to a category of options and there are not enough bits corresponding to a binary bit field to represent the additional options. In this situation, a new part number format is preferably created to incorporate the new available options into an expanded binary bit field. Similarly, if a new category of options is added, a new part number format would be required as well. The new part number format simply changes the sizes of the binary bit fields where needed, extending into the reserved spaces of the current part number format. The version number of the new part number format would be a value higher than the previous one.

In an example, the Component Look-Up in Table 1 would have to be updated with any addition of new options (or categories of options). The new option is assigned the next logical value for the category of options, and the format version field is assigned a new version number. Part numbers for systems with the new option will be formatted with the new part number format.

New part number formats preferably never replace an earlier version. All versions of the part number format are preferably maintained since older formats are still required for the previously issued part numbers. The new part number format is preferably only used to define part numbers for those new systems that cannot be defined by an earlier part number format. No previously published part numbers are changed. A system's part number is preferably always formatted using the earliest version of the part number format defining all its selections.

In the part number format, the number of bits defining the version number is not necessarily the same for all versions of part number formats. The field defining the version number may be larger than one bit. The size of the field defining the version number will be preferably as large as necessary to express all of the version numbers.

The use of version numbers is a revision control mechanism within the encoding and decoding process of the part numbers. As the part numbers grow, they still maintain the uniqueness and reversibility of the older part number versions, yet being flexible enough to accommodate and store representations of new options and categories.

As illustrated in FIG. 7, step 30 partitions the string of bits, currently stored in the computer memory, into five fixed length partitions, each partition being five bits long. These fixed length partitions are then stored in the computer memory 802 (in FIG. 8).

Step 40 represents each of the fixed length partitions by a human readable symbol. In the example in FIG. 7, one of several base-32 symbols, corresponding to the values in Table 2 below, represents each of the fixed length partitions. The software program maintains a data structure associating data for each decimal value (in binary form) with its corresponding base-32 value in a computer readable medium, preferably either in the computer memory (RAM) 802 (IN FIG. 8) or on the hard disk drive. Step 40 accesses this data structure for generating computer readable symbols. The fixed length partitions in binary form correspond to a decimal value found in Table 2 below.

TABLE 2

Base 32 Values (Symbols) Corresponding to Fixed Length Binary Representation

| Fixed Length Binary Representation | Base 32 Value | Fixed Length Binary Representation | Base 32 Value |
|---|---|---|---|
| 00000 | 0 | 10000 | J |
| 00001 | 1 | 10001 | K |
| 00010 | 2 | 10010 | L |
| 00011 | 3 | 10011 | M |
| 00100 | 4 | 10100 | N |
| 00101 | 5 | 10101 | P |
| 00110 | 6 | 10110 | Q |
| 00111 | 7 | 10111 | R |
| 01000 | 8 | 11000 | S |
| 01001 | 9 | 11001 | T |
| 01010 | C | 11010 | U |
| 01011 | D | 11011 | V |
| 01100 | E | 11100 | W |
| 01101 | F | 11101 | X |
| 01110 | G | 11110 | Y |
| 01111 | H | 11111 | Z |

Step 40 assigns each of the fixed length partitions a base-32 symbol. (For example, "0010" in binary is equivalent to the decimal "6", which is also "6" in base-32 format according to Table 2 above; "01000" in binary is equivalent to the decimal "8", which is also "8" in base-32 format according to Table 2 above; and "00000" in binary is equivalent to the decimal "0", which is also "0" in base-32 format according to Table 2 above. Another illustrative example is, if the fixed length partition is "01111", then the binary equivalent is the decimal "15", which is "H" in base-32 format according to Table 2 above; and if the fixed length partition is "10110", then the binary equivalent is the decimal "22", which is "Q" in base-32 format according to Table 2 above.) In the example of Table 2, only numerals and capital letters of the alphabet are utilized to represent base-32 values. Furthermore, certain letters of the alphabet were omitted (such as A, B, I, and O) for special use or to avoid confusion with numerals having a similar appearance. The use of only numerals and capital letters of the alphabet increase the ease of of the part number. Each of the human readable symbols are stored in the computer memory 802 (in FIG. 8).

Finally, step 50 combines all the human readable symbols to produce a human readable part number. In the example in FIG. 7, the human readable part number for a computer system with a 166 PII CPU, an eight gigabyte hard disk drive, and 64 megabytes of RAM would be represented by "68000". The "68000" part number is human readable and easy to record. The customer and the manufacturer of the built-to-order computer system may make reference to the human readable part number to confirm the selected options of the built-to-order system.

Additionally, step 60 of FIG. 1 may produce an output of the human readable part number to a human readable medium, such as a computer screen 803 (in FIG. 8), or a printout from a computer printer 804 (in FIG. 8).

Figure 2:
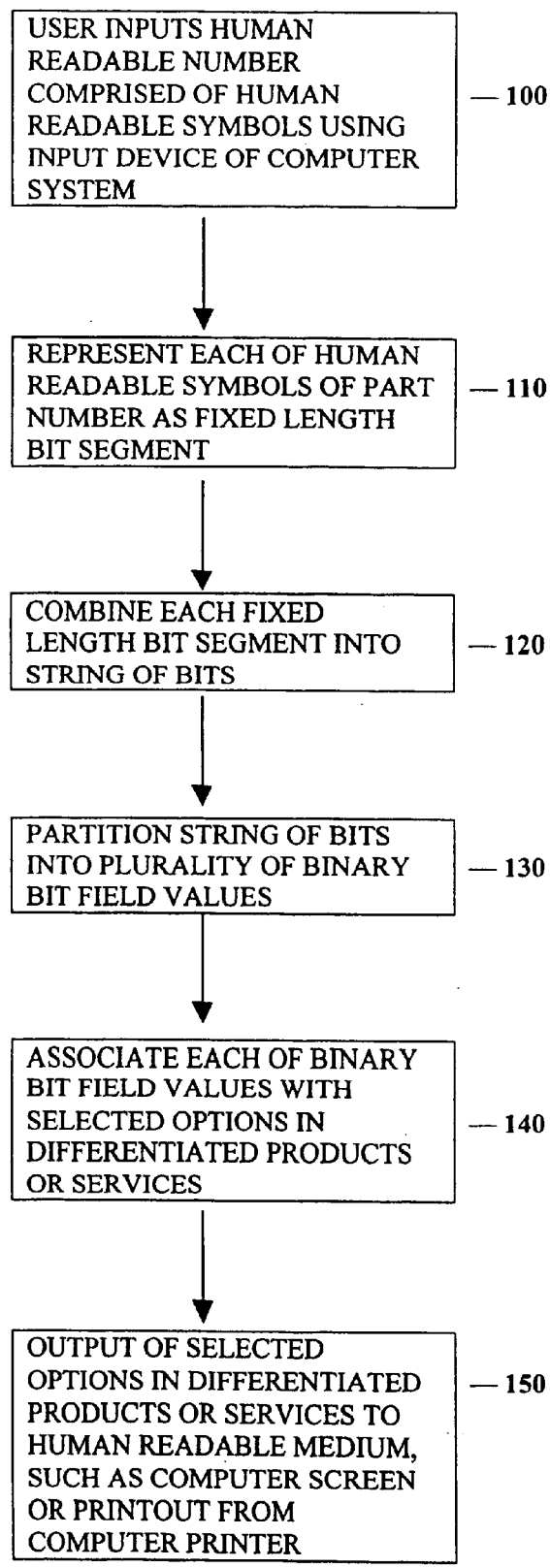
FIG. 2 is a flow chart diagram illustrating a decoding process from a human readable number in accordance with an embodiment of the present invention.

FIG. 2 is a flow chart diagram illustrating the decoding process from a part number in accordance to an embodiment of the present invention. In step 100, a user inputs a human readable number (encoded by the process described above) to an input device 805 (in FIG. 8) of a computer system. A software program executes on a computer system 800 (in FIG. 8), and prompts the user to enter the human readable number through a graphical user interface on a computer screen 803 (in FIG. 8). Step 110, the first step in the decoding process, represents each of the human readable symbols of the part number as fixed length bit segments in computer memory 804 (in FIG. 8). From the example in FIG. 7, the "68000" part number, represented by human readable base-32 symbols, would be represented by the binary expressions of "00110", "01000", "00000", "00000", and "00000", respectively, for each of the human readable base-32 symbols in the part number. As stated above, each base-32 numeral is associated with its corresponding five bit binary expression in a computer readable medium, preferably either in the computer memory (RAM) 802 (in FIG. 8) or on the hard disk drive, for access in step 110.

Step 120 combines each of these fixed length bit segments, currently stored in the computer memory, to form a string of bits. The string of bits is also stored in the computer memory 802 (in FIG. 8).

Step 130 partitions the string of bits into one or more binary bit field values. Based on the part number format used, each of the binary bit field values are associated with one of the selected options for components in the built-to-order system or the differentiated services in an overall customized service package. In the example in FIG. 3, the component fonnat includes bit fields that are to represent selected options for the CPU, the hard disk drive, and the RAM features. And from FIG. 4, the binary bit field value for the selected CPU option is "001", the binary bit field value for the selected hard disk drive option is "100", and the binary bit field value for the selected RAM option is "10". These binary bit field values are stored in the computer memory 802 (in FIG. 8).

Finally step 140 associates each of the binary bit field values with an option in each one of the differentiated components in the built-to-order system. By referring to Table 1 above, the CPU binary bit field value of "001" represents a 166 PII CPU, the hard disk drive binary bit field value of "100" represents an eight gigabyte hard disk drive, and the RAM binary bit field value of "10" represents 64 megabytes of RAM. As stated above, the software program associates all of the data for each available option with its corresponding binary bit field value in a computer readable medium, preferably either in the computer memory (RAM) 802 (in FIG. 8) or on the hard disk drive. Step 140 accesses this data during the association of each binary bit field value with the selected options. Step 150 of FIG. 2 may produce an output of the selected options determined from the human readable number to a human readable medium, such as a computer screen 803 (in FIG. 8), or a printout from a computer printer 804 (in FIG.8).

As mentioned above, a preferred embodiment of the present invention is performed by a software program executing on a computer system 800 (in FIG. 8). The computer system 800 (in FIG. 8) may be connected through the Internet to a remote computer (where the customer is operating), or free-standing, such as in a kiosk or a booth. There is a display output from the computer system (a computer screen), as well as user input devices 805 (in FIG. 8), such as a keyboard or a mouse pointer. The software program displays the options available for a built-to-order system or an overall customized service package through a graphical user interface on the computer screen 803 (in FIG. 8) and prompts the customer to select an option from the available differentiated products or services.

Once the customer makes all the selections, the software program executing on the computer system 800 (in FIG. 8) performs the steps shown in FIG. 1. The selected options are represented as binary bit field values. Then, the binary bit field values are combined into a string of bits in an ordered sequence. Next, the string of bits are partitioned into fixed length partitions. Each of the fixed length partitions are then represented by a human readable symbol, preferably an ASCII symbol. ASCII symbols are human readable and are easily transmitted from one computer system 800 (in FIG. 8) to another. All the human readable symbols are combined to produce a human readable number.

The human readable number may be displayed on a computer screen 803 (in FIG. 8) to the customer or printed out. Furthermore, the human readable number may be transmitted to the manufacturer of the built-to-order system. The human readable number is in a short and compact format, as opposed to being a long list of all the selected options. The compact number also minimizes the amount of computer memory 804 (in FIG. 8) required to store the information being tracked by the manufacturer or service provider.

Once the human readable number is received, it may be decoded to determine the options selected by the customer. The software program executing on the computer system 800 (in FIG. 8) may also perform the decoding function, as shown in FIG. 2. Each of the human readable symbols of the human readable number are represented by a fixed length bit segment. Then, each of the fixed length bit segments are combined to form a string of bits. Next, the string of bits are partitioned into one or more binary bit field values. Finally, each of the binary bit field values are associated with a selected option of the built-to-order system. The human readable part number may also be used as a reference or confirmation number for the customer when inquiring about the components within the built-to-order system.

Another embodiment of the present invention is for representing one or more options of a number of services in an overall customized service package to be performed, such as a car wash. The customer can select from a variety of services being offered. In a typical car wash, there may be several services, each with a number of options available, such as waxing, tire dressing, and interior dressing. For the waxing service, the options may include a spray wax, a polish wax, a hand wax, or no wax at all. As for the tire dressing service, there may be an option for tire dressing with a particular protectant (such as Armor-All (TM)), or no tire dressing at all. Similarly, the interior dressing service may have options of dressing with a particular protectant (such as Armor-All (TM)), or even no interior dressing at all. Of course, there may also be other service features, such as body detailing, engine steaming, protective sealant treatment, etc., each with a number of available options, such as the use of a particular treatment, wash, etc.

After the customer selects the options, preferably using the input device 805 (in FIG. 8) of a computer system 800 (in FIG. 8) at a booth or a kiosk, the software program executing on the computer system 800 (in FIG. 8) produces a human readable number, generated in the same fashion as described above for the built-to-order computer system. The human readable number may be displayed on a computer screen 803 (in FIG. 8) or printed out for the customer. The customer may have the human readable number to review the options selected. The service provider may use the human readable number to ensure that the correct services are performed, as well as to keep a record of the different types of services performed. The human readable number is in a small and compact format, as opposed to being a long list of options selected by customers. The compact format of the number will also minimize the amount of computer memory 804 (in FIG. 8) required to store the information being tracked by the service provider.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A method of representing a product from a group of differentiated products in a built-to-order system, the group of differentiated products having a plurality of options associated therewith, the method comprising:

presenting a user with said plurality of options;

representing in a computer readable medium an association of each of said plurality of options with one or more binary bit field values;

receiving signals representative of selection of at least one of said options associated with said product;

combining binary bit field values corresponding to each of the at least one selected options associated with said product into a string of bits in an ordered sequence;

partitioning the string of bits into fixed length partitions; and representing each of the fixed length partitions with a human readable symbol in a human readable medium to identify said product.

2. The method according to claim 1, wherein each of said human readable symbols is selected from a plurality of base-32 symbols.

3. The method according to claim 1, wherein the string of bits and a second string of bits have binary bit field values, each binary bit field value having an associated bit length being associated with each one of the differentiated products, the string of bits and the second string of bits having binary bit field values according to a format in which each of the binary bit field values have a set length, wherein the string of bits and the second string of bits differ by at least one of the binary bit field values having a different set length, the string of bits and the second string of bits being distinguishable by a version number stored as one of the binary bit field values in the string of bits and the second string of bits.

4. A method for extracting data from a part number having human readable symbols representing a product from a group of differentiated products in a built-to order system, the group of differentiated products having a plurality of options associated therewith, the method comprising:

representing each one of the human readable symbols as a fixed length bit segment in a computer readable memory;

combining each fixed length bit segment into a string of bits;

partitioning the string of bits into one or more binary bit field values;

associating each of the binary bit field values with a selected option associated with said product; and identifying the one or more options associated with said product.

5. The method according to claim 4, wherein the human readable symbols are selected from a plurality of base-32 symbols.

6. The method according to claim 4, further comprising the step of:

associating one of the binary bit field values with a version number for the part number.

7. An apparatus for producing a human readable part number representing a product from a group of differentiated products in a built-to-order system, the group of differentiated products having a plurality of options associated therewith, the apparatus comprising:

an input device for receiving a signal representative of a selection of at least one of the plurality of options, said at least one selected options associated with said product;

a processor that combines one or more binary bit field values in an ordered sequence to provide a string of bits, each of the binary bit field values representing said at least one selected options, partitions the string of bits into fixed length partitions and represents each of the fixed length partitions as a human readable symbol; and an output device that presents each of the human readable symbols in a human readable medium to identify said product.

8. The apparatus according to claim 7, wherein the human readable symbols are selected from a plurality of base-32 symbols.

9. The apparatus according to claim 7, wherein one of the binary bit field values represents a version number of the human readable part number.

10. An apparatus for determining from a human readable part number a selection of at least one option in a product from a group of differentiated products in a built-to-order system, the group of differentiated products having a plurality of options associated therewith, the apparatus comprising:

an input device to receive a representation of the human readable part number comprised of human readable symbols;

a processor that represents the human readable symbols of the human readable part number as fixed length bit segments in a computer readable memory, combines the fixed length bit segments into a string of bits, partitions the string of bits into fixed length partitions to provide one or more binary bit field values, and determines the selection of at least one option associated with said product from the binary bit field values; and an output device for displaying information identifying the one or more options associated with said product.

11. The apparatus according to claim 10, wherein the human readable symbols are selected from a plurality of base-32 symbols.

12. The apparatus according to claim 10, wherein the processor further determines a version number of the human readable part number from one of the binary bit field values.

13. An apparatus for producing a human readable part number representing a product from a group of differentiated products in a built-to-order system, the group of differentiated products having a plurality of options associated therewith, the apparatus comprising:

a memory for storing one or more binary bit field values representing one or more options that are selected;

a processor that combines the binary bit field values in an ordered sequence to provide a string of bits, each of the binary bit field values representing a selected option and having a length associated therewith;

a memory for storing the string of bits;

a processor that partitions the string of bits into fixed length partitions;

a memory for storing the fixed length partitions;

a processor that represents each of the fixed length partitions as a human readable symbol to form said human readable part number; and an output device that presents said human readable part number to identify said product.

14. The apparatus according to claim 13, wherein the human readable symbols are selected from a plurality of base-32 symbols.

15. The apparatus according to claim 13, wherein one of the binary bit field values represents a version number of the human readable part number.

16. An apparatus for determining from a human readable part number a selection of an option in a product from a group of differentiated products in a built-to-order system, the group of differentiated products having a plurality of options associated therewith the apparatus comprising:

a memory for storing the human readable part number comprised of human readable symbols;

a processor that represents the human readable symbols of the human readable part number as fixed length bit segments;

a memory for storing the fixed length bit segments;

a processor that combines the fixed length bit segments into a string of bits;

a memory for storing the string of bits;

a processor that partitions the string of bits into fixed length partitions to provide one or more binary bit field values;

a memory for storing the binary bit field values;

a processor that determines the selection of an option associated with said product from the binary bit field values; and an output device for displaying information identifying the one or more options associated with said product.

17. The apparatus according to claim 16, wherein the human readable symbols are selected from a plurality of base-32 symbols.

18. The apparatus according to claim 16, wherein the process further determines a version number of the human readable part number from one of the binary bit field values.

19. A method for representing a service from a group of differentiated services in an overall customized service package, the group of differentiated services having a plurality of options associated therewith, the method comprising:

representing in a computer readable medium an association of each of said options with one or more binary bit field values;

receiving signals representative of selection of at least one of said one or more options associated with said product; combining binary bit field values corresponding to each of the at least one selected options associated with said service, into a string of bits in an ordered sequence; partitioning the string of bits into fixed length partitions; representing each of the fixed length partitions with a human readable symbol in a human readable medium; and identifying said service to a user by said human readable symbols.

20. The method according to claim 19, wherein each of said human readable symbols is selected from a plurality of base-32 symbols.

21. The method according to claim 19, wherein the string of bits and a second string of bits have binary bit field values, each binary bit field value having an associated bit length being associated with each one of the differentiated services, the string of bits and the second string of bits having binary bit field values according to a format in which each of the binary bit field values have a set length, wherein the string of bits and the second string of bits differ by at least one of the binary bit field values having a different set length, the string of bits and the second string of bits being distinguishable by a version number stored as one of the binary bit field values in the string of bits and the second string of bits.

22. A method for extracting data from a number having human readable symbols representing a service from a group of differentiated services in an overall customized service package, the group of differentiated services having a plurality of options associated therewith, the method comprising:

representing each one of the human readable symbols as a fixed length bit segment in a computer readable memory;

combining each fixed length bit segment into a string of bits; partitioning the string of bits into one or more binary bit field values;

associating each of the binary bit field values with a selected option associated with said product: and identifying the one or more options associated with said service to a user.

23. The method according to claim 22 wherein the human readable symbols are selected from a plurality of base-32 symbols.

24. The method according to claim 22, further comprising the step of:

associating one of the binary bit field values with a version number for the number having human readable symbols.

25. An apparatus for producing a human readable number representing a service from a group of differentiated services in an overall customized service package, the group of differentiated services having a plurality of options associated therewith, the apparatus comprising:

an input device for receiving a signal representative of a selection of at least one of the plurality of options associated with said service;

a processor that combines one or more binary bit field values in an ordered sequence to provide a string of bits, each of the binary bit field values representing said at least one selected options, partitions the string of bits into fixed length partitions, and represents each of the fixed length partitions as a human readable symbol; and an output device that presents each of the human readable symbols to a user to identify said service.

26. The apparatus according to claim 25 wherein the human readable symbols are selected from a plurality of base-32 symbols.

27. The apparatus according to claim 25, wherein one of the binary bit field values represents a version number of the human readable number.

28. An apparatus for determining from a human readable number a selection of an option in a service from a group of differentiated services in an overall service package, the group of differentiated services having a plurality of options associated therewith, the apparatus comprising:

an input device to receive a representation of the human readable number comprised of human readable symbols;

a processor that represents the human readable symbols of the human readable number as fixed length bit segments in a computer readable memory, combines the fixed length bit segments into a string of bits, partitions the string of bits into fixed length partitions to provide one or more binary bit field values, and determines the selection of at least one option associated with said service from the binary bit field values, and an output device for displaying to a user information identifying the at least one option associated with said service.

29. The apparatus according to claim 28, wherein the human readable symbols are selected from a plurality of base-32 symbols.

30. The apparatus according to claim 28, wherein the processor further determines a version number of the human readable number from one of the binary bit field values.

31. An apparatus for producing a human readable number representing a service from a group of differentiated services in an overall service package, the group of differentiated services having a plurality of options associated therewith, the apparatus comprising:

a memory for storing one or more binary bit field values representing one or more options that are selected, a processor that combines the binary bit field values in an ordered sequence to provide a string of bits, each of the binary bit field values representing a selected option in each one of the differentiated services and having a length associated therewith;

a memory for storing the string of bits;

a processor that partitions the string of bits into fixed length partitions;

a memory for storing the fixed length partitions;

a processor that represents each of the fixed length partitions as a human readable symbol to form said human readable number; and an output device that presents said human readable number to a user to identify said service to said user.

32. The apparatus according to claim 31 wherein the human readable symbols are selected from a plurality of base-32 symbols.

33. The apparatus according to claim 31, wherein one of the binary bit field values represents a version number of the human readable number.

34. An apparatus for determining from a human readable number a selection of an option in a service from a group of differentiated services in an overall service package, the group of differentiated services having a plurality of options associated therewith, the apparatus comprising:

a memory for storing the human readable number comprised of human readable symbols;

a processor that represents the human readable symbols of the human readable part number as fixed length bit segments;

a memory for storing the fixed length bit segments;

a processor that combines the fixed length bit segments into a string of bits, a memory for storing the string of bits;

a processor that partitions the string of bits into fixed length partitions to provide one or more binary bit field values;

a memory for storing the binary bit field values;

a processor that determines the selection of an option associated with said service from the binary bit field values; and an output device for displaying to a user information identifying the option associated with said service.

35. The apparatus according to claim 34 wherein the human readable symbols are selected from a plurality of base-32 symbols.

36. The apparatus according to claim 34, wherein the process further determines a version number of the human readable number from one of the binary bit field values.

37. An apparatus for producing a human readable part number representing a product from a group of differentiated products in a built-to-order system, the group of differentiated products having a plurality of options associated therewith, the apparatus comprising:

a computer readable medium encoded with an association of each option with one or more binary bit field values, each of the binary bit field values corresponding to one or more options associated with one of the differentiated products;

a processor adapted to combine selected ones of the one or more binary bit field values in an ordered sequence to provide a string of bits, to partition the string of tits into fixed length partitions, and to represent each of the fixed length partitions as a human readable symbol; and an output device that presents said human readable part number to a user to identify said product to said user.

38. An apparatus for determining from a human readable part number a selection of an option in a product from a group of differentiated products in a built-to-order system, the group of differentiated products having a plurality of options associated therewith, the apparatus comprising:

a computer readable medium;

a processor adapted to represent each of the human readable symbols of the human readable part number as fixed length bit segments in the computer readable medium, to combine the fixed length bit segments into a string of bits, to partition the string of bits into fixed length partitions to provide one or more binary bit field values, and to determine the selection of the option in each one of the differentiated products in the built-to-order system from the binary bit field values; and an output device for displaying to a user information identifying the one or more options associated with said product.

* * * * *